United States Patent
Stoffels et al.

(10) Patent No.: US 9,303,570 B2
(45) Date of Patent: Apr. 5, 2016

(54) METHOD AND DEVICE FOR CONTROLLING A STARTING PROCESS OF A MOTOR VEHICLE

(75) Inventors: Harald Stoffels, Cologne (DE); Klemens Grieser, Langenfeld (DE)

(73) Assignee: Ford Global Technologies, LLC, Dearborn, MI (US)

(*) Notice: Subject to any disclaimer, the term of this patent is extended or adjusted under 35 U.S.C. 154(b) by 556 days.

(21) Appl. No.: 13/417,086

(22) Filed: Mar. 9, 2012

(65) Prior Publication Data

US 2012/0234004 A1 Sep. 20, 2012

(30) Foreign Application Priority Data

Mar. 14, 2011 (DE) .................. 10 2011 005 502

(51) Int. Cl.
  *F02B 33/44* (2006.01)
  *F02B 33/00* (2006.01)
  (Continued)

(52) U.S. Cl.
  CPC ............ *F02D 23/00* (2013.01); *F02D 41/0007* (2013.01); *F02D 41/062* (2013.01); *B60W 30/192* (2013.01); *B60W 2550/12* (2013.01); *B60W 2550/142* (2013.01); *B60Y 2400/435* (2013.01); *F02D 41/022* (2013.01); *F02D 41/0225* (2013.01); *F02D 41/08* (2013.01); *F02D 2200/0414* (2013.01); *F02D 2200/50* (2013.01); *F02D 2200/502* (2013.01); *F02D 2200/602* (2013.01); *F02D 2200/702* (2013.01);
  (Continued)

(58) Field of Classification Search
  CPC ..... F02D 23/00; F02D 41/062; F02D 41/007; F02D 41/022; F02D 41/08; F02D 220/0414; F02D 2200/0418; F02D 2200/0404; F02D 2200/50; F02D 2200/602; F02D 2200/702; F02D 2200/703; F02D 2200/704; F02D 2250/18; F02D 2250/22; F02D 41/0225; F02D 2009/0249; Y02T 10/144; B60W 30/192; B60W 2550/12; B60W 2550/14; B60W 2550/142
  USPC ............. 60/605.1, 607–609, 612; 123/559.1, 123/559.3; 180/65.2, 65.21, 65.28, 65.265, 180/65.23; 903/903; 318/701
  IPC .................................. F02D 41/10, 23/02, 45/00
  See application file for complete search history.

(56) References Cited

U.S. PATENT DOCUMENTS 3,007,626 A * 11/1961 Simson .......................... 123/564
4,597,265 A * 7/1986 Buck et al. ...................... 60/602
(Continued)

FOREIGN PATENT DOCUMENTS

CN          101952578 A      1/2011
WO     WO 2006089779 A1  *  8/2006 .............. F02B 33/44

OTHER PUBLICATIONS

Partial Translation of Office Action of Chinese Application No. 2012100661486, Issued Aug. 4, 2015, State Intellectual Property Office of PRC, 9 Pages.

*Primary Examiner* — Thai Ba Trieu
(74) *Attorney, Agent, or Firm* — Julia Voutyras; Alleman Hall McCoy Russell & Tuttle LLP (57) ABSTRACT

Methods and systems for controlling an engine that may be automatically stopped and started are presented. In one example, a compressor is activated from a deactivated state in response to one or more environmental parameters during an engine start. The methods and systems may improve engine response after an engine start.

17 Claims, 4 Drawing Sheets

(51) Int. Cl.
  *B60K 6/20* (2007.10)
  *B60W 20/00* (2006.01)
  *F02D 23/00* (2006.01)
  *F02D 41/06* (2006.01)
  *F02D 41/00* (2006.01)
  *F02D 41/02* (2006.01)
  *F02D 41/08* (2006.01)
  *B60W 30/192* (2012.01)

(52) U.S. Cl.
  CPC ....... *F02D 2200/703* (2013.01); *F02D 2250/18* (2013.01); *F02D 2250/22* (2013.01); *Y02T 10/144* (2013.01)

(56) References Cited

U.S. PATENT DOCUMENTS

| | | | |
|---|---|---|---|
| 4,970,864 A * | 11/1990 | Kazuo et al. | 60/602 |
| 5,362,207 A * | 11/1994 | Martin et al. | 417/243 |
| 5,551,236 A * | 9/1996 | Zimmer et al. | 60/605.1 |
| 5,906,098 A * | 5/1999 | Woollenweber et al. | 60/608 |
| 6,298,718 B1 * | 10/2001 | Wang | 701/100 |
| 6,343,473 B1 * | 2/2002 | Kanesaka | 60/609 |
| 6,532,926 B1 * | 3/2003 | Kuroda et al. | 903/903 |
| 6,554,088 B2 * | 4/2003 | Severinsky et al. | 180/65.23 |
| 6,672,415 B1 * | 1/2004 | Tabata | 180/65.25 |
| 6,684,863 B2 * | 2/2004 | Dixon et al. | 123/559.1 |
| 6,784,633 B2 * | 8/2004 | Ieoka | 318/701 |
| 6,945,221 B2 * | 9/2005 | Baeuerle | 123/319 |
| 7,028,795 B2 * | 4/2006 | Tabata | 180/65.21 |
| 7,273,120 B2 * | 9/2007 | Tabata | 180/65.265 |
| 7,665,302 B2 * | 2/2010 | Nemeth | F02D 9/02 60/605.1 |
| 8,087,401 B2 * | 1/2012 | Inoue et al. | 123/559.3 |
| 8,245,802 B2 * | 8/2012 | Inoue et al. | 180/65.28 |
| 8,282,528 B2 * | 10/2012 | Jager | F02D 9/02 477/32 |
| 2003/0062869 A1 * | 4/2003 | Ieoka | 318/701 |
| 2003/0140905 A1 * | 7/2003 | Nau et al. | 123/559.3 |
| 2004/0079564 A1 * | 4/2004 | Tabata | 180/65.2 |
| 2005/0000217 A1 * | 1/2005 | Nau et al. | 60/612 |
| 2006/0113129 A1 * | 6/2006 | Tabata | 180/65.2 |

* cited by examiner

METHOD AND DEVICE FOR CONTROLLING A STARTING PROCESS OF A MOTOR VEHICLE

RELATED APPLICATIONS

The present application claims priority to German Patent Application No. 102011005502.9, filed on Mar. 14, 2011, the entire contents of which are hereby incorporated by reference for all purposes.

FIELD

The present description relates to a method and to a device for controlling a starting process of a motor vehicle which is driven by a supercharged internal combustion engine.

BACKGROUND AND SUMMARY

Internal combustion engines, in particular diesel engines and spark ignition engines, are increasingly provided with compressors for the air which is fed to the engine. A considerable increase in power can be obtained by compressing the charge air which is fed to the engine. Conversely, a predefined power can be achieved by a supercharged engine with a relatively small cubic capacity, as a result of which a relatively small and relatively lightweight design can be achieved and the vehicle can be driven in a way which is more economical in terms of the consumption of fuel.

Such compressors can be embodied, for example, as exhaust gas turbochargers or else as engine-operated compressors. Exhaust gas turbochargers are driven by the stream of exhaust gas of the internal combustion engine. The turbocharger has for this purpose a turbine which is arranged in the stream of exhaust gas and which drives a compressor which compresses the charge air of the engine. Such a compressor can, however, also be driven by the internal combustion engine via a belt drive or directly by means of the crankshaft.

Since an exhaust gas turbocharger is driven by a turbine which is arranged in the stream of exhaust gas, the compression effect and therefore the increase in power of the internal combustion engine are dependent on the stream of exhaust gas; a perceptible increase in the torque therefore occurs only at relatively high rotational speeds of the internal combustion engine. A compressor which is driven by the internal combustion engine can also make available an increased charge pressure even at a relatively low rotational speed; however, such a compressor requires a considerable portion of the power which is made available by the internal combustion engine.

For these reasons, combinations of an exhaust gas turbocharger with a compressor (often also referred to as a "supercharger"), driven by the internal combustion engine, are also used, wherein both compressors operate in parallel with one another or in series. In order to avoid the consumption of power by the compressor when the compressor is not required, it is possible, for example, to provide a clutch which decouples the compressor in the idling mode of the internal combustion engine.

When a motor vehicle starts, the situation generally occurs in which, by activating the accelerator pedal, the driver requests a large torque in order to accelerate the motor vehicle, but the compressor or compressors for supercharging the engine are, owing to the idling state of the engine, not in an operating state in which the engine can be supplied with an effective charging pressure. For this purpose it is desired, for example, to reach a sufficient rotational speed for the exhaust gas turbocharger and to close the clutch of the compressor; only when the respective compressor has itself reached a sufficient rotational speed is it possible for the internal combustion engine to be provided with a charging pressure which gives rise to the desired increase in the torque or power. In the case of an engine which is of relatively small design for reasons of economy, and in order to achieve the desired power, is provided with one or more charge air compressors, only a relatively low power is therefore available at the beginning of a starting process.

This applies, in particular, when unfavorable ambient conditions apply in which the internal combustion engine only outputs a reduced torque or a reduced power owing to the thermodynamic conditions, that is to say, for example, in the case of the reduced air pressure at high altitude or of high external temperatures. This is particularly problematic when an increased torque is already desired for starting, for example if the motor vehicle is located on an uphill slope and has an increased mass, for example owing to a trailer. In such cases, the torque available for starting is frequently insufficient.

The object of the present description is to provide a method and a device for controlling the starting of a motor vehicle which is driven by a supercharged internal combustion engine, with which method and device the abovementioned disadvantages do not occur.

This object is achieved by means of a method and a device such as are disclosed in the claims. In the case of a motor vehicle which is driven by an internal combustion engine which is supercharged by at least one compressor, the beginning of a starting process is detected. This can already occur at a very early time, in particular before the driver requests an increased torque, for example by depressing the accelerator pedal by a corresponding amount.

According to the description, at least one operating parameter of the motor vehicle and/or at least one environmental parameter are/is sensed. Corresponding sensors may be provided for this purpose, the signals of which sensors are sensed and evaluated. The at least one compressor is activated in a predictive fashion if the at least one operating parameter and/or environmental parameter is outside a predetermined range (e.g., a desired range) of values of the parameter. In order to activate the compressor, it is possible, for example, to close a clutch, by means of which the compressor is driven by the engine, or else to activate an electric drive of the compressor so that the compressor is driven and builds up the charging pressure.

By activating the compressor in response to the environmental parameter it may be possible to provide a desired engine output torque at the time of starting and as the driver increases the engine torque demand. For example, pressurized air may be provided to the engine air intake during engine cranking and as engine speed accelerates to achieve idle speed. Further, when the engine can provide the desired level of torque at the existing environmental conditions without aid of the compressor, the compressor may not be activated during cranking and engine run-up to idle speed so that fuel consumption may be reduced.

The present description may provide several advantages. Specifically, the approach may provide a desired amount of engine torque during starting over a wide range of environmental conditions. Further, the approach may conserve fuel by not activating a compressor during engine starting when the engine does not need the compressor to provide the desired engine output torque.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example, referred to herein as the Detailed Description, when taken alone or with reference to the drawings, where.

DETAILED DESCRIPTION

Figure 1:
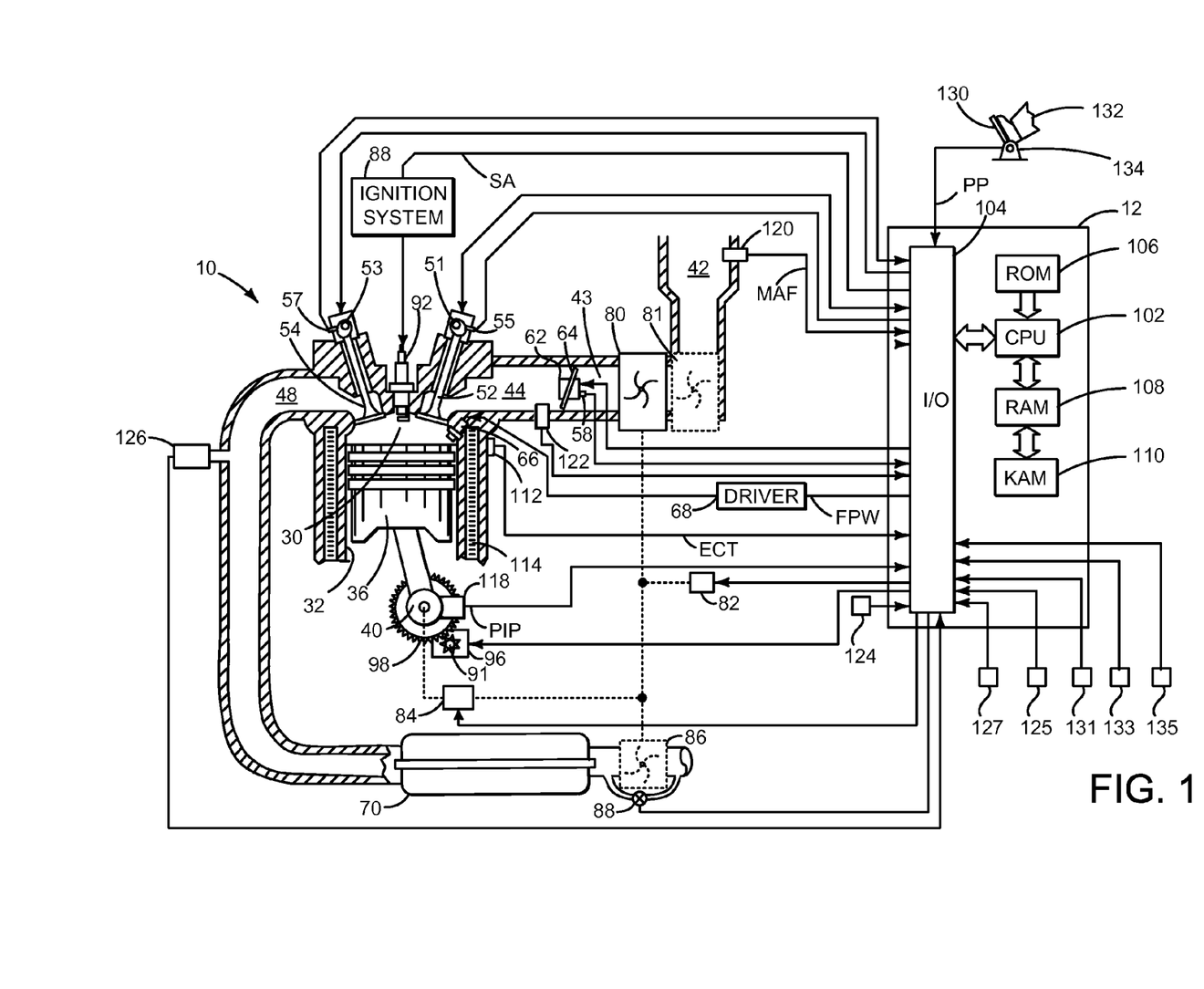
FIG. 1 is a schematic diagram of an engine.

The present description is related to starting an engine that includes a compressor that directs air to the engine. In one non-limiting example, the compressor may be selectively activated before or during engine cranking in response to one or more ambient environmental conditions. In on example, engine may be configured as illustrated in FIG. 1. Engine starting may be performed according to the method described in FIGS. 2 and 3.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In one example, a high pressure, dual stage, fuel system may be used to generate higher fuel pressures.

Intake manifold 44 is shown communicating with optional electronic air inlet throttle 62 which adjusts a position of air inlet throttle plate 64 to control air flow from boost chamber 43 to intake manifold 44. Compressor 80 and optional compressor 81 provide compressed air from air intake 42 to boost chamber 43. Compressor 80 and optional compressor 81 may be combined in series or parallel configurations with respect to each other. Compressor 80 may be mechanically driven by engine 10 via clutch 84. In other examples, compressor 80 may be electrically driven via motor 82. In still other examples, compressor 80 may be driven via turbine 86 which rotates a shaft when exhaust gas acts on turbine 86. Compressor 80 may be deactivated via opening clutch 84 when compressor 80 is driven by engine 10. Compressor 80 may be deactivated by stopping current flow to electric motor 82 when compressor 80 is electrically driven. Compressor 80 may be deactivated by opening wastegate 88 when compressor 80 is driven via turbine 86. Wastegate 88 allows exhaust gas to be directed around turbine 86. Optional compressor 81 may be driven in similar ways as compressor 80.

Ignition coil 88 provides an ignition spark to combustion chamber 30 via spark plug 92 in response to a signal from controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Engine starter 96 may selectively engage flywheel 98 which is coupled to crankshaft 40 to rotate crankshaft 40. Engine starter 96 may be engaged via a signal from controller 12. In some examples, engine starter 96 may be engaged without input from a driver dedicated engine stop/start command input (e.g., a key switch or pushbutton). Rather, engine starter 96 may be engaged via pinion 91 when a driver releases a brake pedal or depresses accelerator pedal 130 (e.g., an input device that does not have a sole purpose of stopping and/or starting the engine). In this way, engine 10 may be automatically started via engine starter 96 to conserve fuel.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; barometric pressure from sensor 124; ambient temperature from sensor 125; a measure of humidity from sensor 131; a measure of incline from sensor 127; a measure of gear position from gear sensor 133; a measure of clutch pedal position from clutch sensor 135; and a measurement of air inlet throttle position from sensor 58. In a preferred aspect of the present description, engine position sensor 118 produces a predetermined number of equally spaced pulses every revolution of the crankshaft from which engine speed (RPM) can be determined. Controller 12 also adjusts current to field coil 97 to control torque applied by starter 96 to crankshaft 40.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

As described above, a compressor of the engine may be activated during engine starting in response to one or more ambient environmental conditions. In motor vehicles which have an exhaust gas turbocharger and a further charge air compressor, this applies, in particular, to the further charge air compressor. The predetermined or desired range of the parameter values indicates under which environmental parameters or operating parameters it can be expected that it will be possible to generate a torque sufficient for the starting process even without switching on the compressor; in the case of parameter values outside the desired range, the compressor is therefore possibly desired or at least useful in order to generate a sufficient torque by increasing the charging pressure. The desired range can be predetermined, in particular, for the motor vehicle or for the internal combustion engine or else calculated as a function of further parameters for the respective starting process. The compressor is therefore activated in a predictive fashion as a function of the at least one operating parameter and/or environmental parameter.

Since the at least one compressor is already activated at a very early time (e.g., during engine cranking or before engine idle speed is reached during an engine start), in particular even before there is a request for increased torque, the charging pressure which is desired to generate the increased torque is available at the time at which an increased torque is actually requested. The period of time between the detection of the beginning of the starting process (e.g., an engine start request via an operator or a controller) and the requesting of the torque which is desirable for starting, by correspondingly depressing the accelerator pedal, is therefore used to activate the compressor and to build up a charging pressure in order to generate the torque. In one example, the compressor may be activated before a first combustion event in the engine after an engine stop. There is therefore no longer a perceptible delay between the depressing of the accelerator pedal and the full response by the engine. Since an environmental parameter is detected before the activation of the at least one compressor whether said compressor is required to carry out the starting process, it is possible to ensure that the compressor is activated only when it is expected to be required; in the case of starting processes for which the at least one compressor is not required (e.g., when the engine can provide the desired level of torque without assistance of the compressor), the compressor is not activated. This makes it possible to avoid undesired consumption of fuel which arises due to the drag power of a compressor which is coupled to the internal combustion engine. In addition, in the event of the power of the compressor being controllable, for example by means of a transmission or by means of an electric drive of the compressor, it is possible to ensure that the compressor is activated in such a way that precisely the charging pressure which is expected to be required, possibly plus a reserve amount of pressure, is available on request.

The method according to the description is particularly advantageous in a semi-automatic or double-clutch transmission, wherein the slip times of the clutches can be reduced and as a result the service life increased.

In the case of a motor vehicle with a clutch which can be activated manually, the beginning of the starting process can be detected by activating the clutch; this activation generally takes place when the driver wishes to engage a gear for starting, and is therefore suitable for detecting the intention of the driver to start. Insofar as a gears is already engaged and the clutch pedal is depressed, the intention of the driver to start can, however, also be detected by the beginning of the movement of the clutch pedal toward the bite-point (e.g., where the clutch transfers a threshold amount of torque from the engine to the transmission). In order to sense the activation of the clutch pedal, a corresponding sensor can be provided on the clutch pedal. The beginning of the starting process can, however, also be detected through the engagement of a gear, which generally takes place immediately before the starting, after the motor vehicle is operated in the idling mode or the engine has started. In still another example, the starting process may be identified when a driver at least partially releases a brake pedal.

In the case of a motor vehicle with an automatic transmission, the beginning of the starting process can be detected, for example, through activation of the accelerator pedal and/or partial release of a brake pedal. Since vehicle with an automatic transmission is often kept in the stationary state by activation of the brake pedal, and the accelerator pedal is not activated until immediately before the starting, this makes reliable detection of the beginning of the starting process possible. Thus, the compressor may be activated from a deactivated state before the engine reaches a desired idle speed in response to an environmental parameter being outside of a predetermined range during an engine start from stop. In order to detect the position of the accelerator pedal, the sensor which is generally present in any case when there is a digital engine control system, or the acquired measured value can be used. However, the release of the brake pedal can also be used to detect the beginning of the starting process, as can also, for example, the engagement of the drive position of the automatic transmission (generally denoted by "D") from the neutral position or parked position ("N" or "P"). Corresponding sensors may be provided for this purpose. In the case of vehicles with a manual gearbox, it may also be advantageous to use the position of the accelerator pedal, in addition to the sensing of the activation of the clutch or of the gear shifting process, to detect the beginning of the starting process.

Since the motor vehicle is not immediately set in motion in all cases after the clutch pedal has been depressed and/or after engagement of a gear, a time period may be provided after whose expiration the compressor is deactivated again if no further activation of the clutch pedal for the purpose of engaging the clutch or no activation of the accelerator pedal has taken place. As a result, the consumption of energy which is caused by the operation of the compressor can be reduced.

According to one preferred example of the description, a first desired torque, which can be generated without activating the at least one compressor, is determined on the basis of the early detection of the driver's intention to accelerate the motor vehicle from the stationary state. For example, compressor activation may also be in response to a desired engine torque when a driver is not depressing an accelerator pedal. The first desired torque can be determined, in particular, in a predictive fashion, e.g. at a time at which said torque has not yet been requested by a corresponding position of the accelerator pedal and at which said torque has not yet been generated either. Furthermore, a second desired torque is determined which is desired to carry out the starting process. The second desired torque is also determined, in particular, at a time at which said torque is not yet requested and is also not already made available by the internal combustion engine. The at least one compressor is activated in a predictive fashion if the first desired torque is smaller than the second desired torque, e.g. in the case in which the second desired torque cannot be generated without switching on the compressor.

It should be noted that in a system that included two compressors, one compressor may be activated during engine starting without activating the second compressor. Further, the first compressor may be activated in response to the one or more environmental parameters mentioned herein. In other example, both compressors may be activated in response to the one or more environmental parameters.

Various types of data can be evaluated as a basis for the activation of the compressor and/or for the determination of the first desired torque and of the second desired torque, which data can comprise, in particular, permanently predefined parameters which are determined by means of the design of the internal combustion engine, of the compressor and, if appropriate, of further additional assemblies of the engine, and further parameters sensed by means of sensors. For example, desired engine torque may be based on a desired engine speed. In one example, the desired engine torque is based on empirical data that describes an engine torque amount that rotates the engine at a desired speed (e.g., idle speed) when no driver torque demand is present. When the driver increases the torque demand, the driver torque demand may be added to the base engine torque demand in order to meet the torque requested by the driver. Thus, the desired engine torque may be based on a driver torque demand and a base torque command to idle the engine at a desired engine speed.

Environmental parameters, which can be advantageously sensed and taken into account, in particular, in the determination of the first desired torque, are, in particular, the pressure and/or the temperature of the ambient air. Since the power of an internal combustion engine depends on the combustion of the fuel with the aid of the oxygen contained in the air fed into the engine, the torque which is generated by the internal combustion engine and the power which is generated are dependent on the pressure and temperature of the air which is fed into the engine. This applies, in particular, also for supercharged internal combustion engines. Therefore, by taking into account the air pressure and the ambient temperature it is possible to determine in any ambient situation what torque can be generated by the internal combustion engine without the compressor being activated, and therefore the compressor can be activated in a way which is adapted to the respective ambient situation. This is important, in particular, when the motor vehicle is at a high altitude with a significantly reduced air pressure. Corresponding sensors may be provided for sensing the air pressure and air temperature. Additionally, humidity can be taken into account when starting the compressor.

An operating parameter which can be advantageously sensed and used, in particular, to determine the second desired torque is, for example, a positive gradient value which indicates the positive gradient of a slope on which the vehicle is to start. For the sensing of the positive gradient it is possible to provide an inclination sensor 127 whose measured value can, if appropriate, be corrected by sensing the load distribution between the front and rear axles. Since the torque which is required for starting depends on the positive gradient, positive-gradient-dependent activation of the compressor also permits comfortable and prompt starting on positive gradients. When starting on a section of road with a negative gradient or even on the flat it is possible, under certain circumstances, to dispense entirely with activation of the compressor.

A further such operating parameter which can be used, in particular, to determine the second desired torque is the mass of the motor vehicle or a mass of the motor vehicle which is increased by a payload. The latter may be sensed, for example, by sensors which are frequently already present within the scope of electronic control systems, for example of a vehicle movement dynamics controller. Since the torque which is desired for a given acceleration during starting depends on the mass of the motor vehicle, mass-dependent activation of the compressor always permits comfortable and prompt starting. In one example, the vehicle mass may be determined via Newton's second law F=MA where the force (F) (e.g., engine torque) and vehicle acceleration (A) during previous vehicle operation are the basis for determining vehicle mass (M).

The mass of a trailer can be sensed in a particularly advantageous way and used in the determination of the second desired torque, since as a result the torque which is desired for starting can change to a considerable degree. In this context, it may already be frequently sufficient to detect the presence of a trailer in order to bring about an activation of the compressor which is appropriate for the situation.

In a particularly advantageous way, both the positive gradient value and the mass of the motor vehicle are sensed, in particular the presence and the charge of a trailer. As a result, in the particularly problematic cases in which the vehicle is to be started on a slope with a laden trailer, the desired activation of the compressor can be controlled and reliable and prompt starting can be ensured.

According to one preferred example of the description, a starting controller is activated on the basis of the detection of the beginning of the starting process. The first desired torque can be determined taking into account the starting controller. The starting controller may comprise here, in particular, a feed-forward controller, on the basis of which, for example, when a planned starting process is detected, the idling speed is increased by, for example, opening further a throttle valve or increasing an injected fuel quantity. As a result, a certain torque reserve or power reserve can already be made available. Feed-forward control can advantageously be activated before the compressor is activated. However, it is also possible to use the feed-forward control after the activation or at another time. The starting controller can, in addition, comprise, for example, an anti-slip controller. In particular, in combination with such a starting controller the method according to the description improves the starting behavior of the motor vehicle from the stationary state considerably.

Since the power of the internal combustion engine which is available for starting and/or the available torque are/is reduced by additional loads such as, for example, a compressor of an air conditioning system, it may advantageously also be provided that the at least one compressor which serves to charge the internal combustion engine is activated as a function of additional loads of the internal combustion engine. In particular, one or more such additional loads can be taken into account in the determination of the second desired torque. As a result, it is possible in a further improved way to ensure that the torque which is desired for starting can be made available. After the engine is started without activating the compressor, the compressor may be activated in response to an increasing driver demand torque provided via the accelerator pedal.

Alternatively or additionally, it may be provided that one or more additional loads of the internal combustion engine are deactivated for the duration of the starting process. As a result, the internal combustion engine is relieved of loading during the starting process, with the result that a relatively high torque for starting is available.

A device according to the description for controlling a starting process of a motor vehicle which is driven by an internal combustion engine which is supercharged by at least one compressor comprises sensor means for detecting the beginning of the starting process, in particular even before a request for increased torque by the driver, and control means for activating the at least one compressor. According to the description, the device comprises further sensor means for sensing at least one operating parameter of the motor vehicle and/or at least one environmental parameter; the control means are embodied in such a way that in the case in which the at least one operating parameter and/or environmental parameter is outside a desired range, the at least one compressor is activated.

The sensor means for detecting the starting process may comprise, for example, the position of the accelerator pedal and/or clutch pedal and/or of the gear shifting lever or of the selector lever in an automatic transmission. The sensor means can be sensors which are also assigned to other open-loop and closed-loop control systems of the motor vehicle.

The further sensor means are designed, in particular, to sense at least one operating parameter of the motor vehicle, such as, for example, the mass of the motor vehicle, the current positive gradient on which the motor vehicle is located and is to be started, and/or the presence of a trailer and the load thereon. Additionally or alternatively, the further sensor means can be designed to sense at least one environmental parameter, for example the pressure and/or temperature of the external air.

The control means can comprise, in particular, a microprocessor 12 which is configured to evaluate the measured values supplied by the sensor means and to actuate the compressor. The control means may, in particular, be part of a digital engine controller. Thus, the compressor may be initially deactivated when the engine is stopped and then activated or not activated in response to environmental conditions during a start (e.g., before a first combustion event or before a driver inputs a torque demand via a throttle or accelerator input).

The control means may be configured, for example, in such a way that, by taking into account the data supplied by the further sensor means, a first desired torque which can be generated without activation of the at least one compressor and a second desired torque which is required for the starting process are determined, and that the at least one compressor is activated in a predictive fashion if the first desired torque is smaller than the second desired torque. For example, the compressor is activated by the control means only when it is desired to generate the torque required for the starting process. If the compressor is not expected to be required, it is not activated. If appropriate, the compressor can be actuated in such a way that it generates only the charging pressure which is expected to be desired, wherein a reserve may be provided.

As a result, it is possible, on the one hand, to minimize the energy consumption by the compressor and, on the other hand, to ensure that at a time at which an increased torque is requested for starting, said torque can also be generated by the internal combustion engine.

Figure 2:
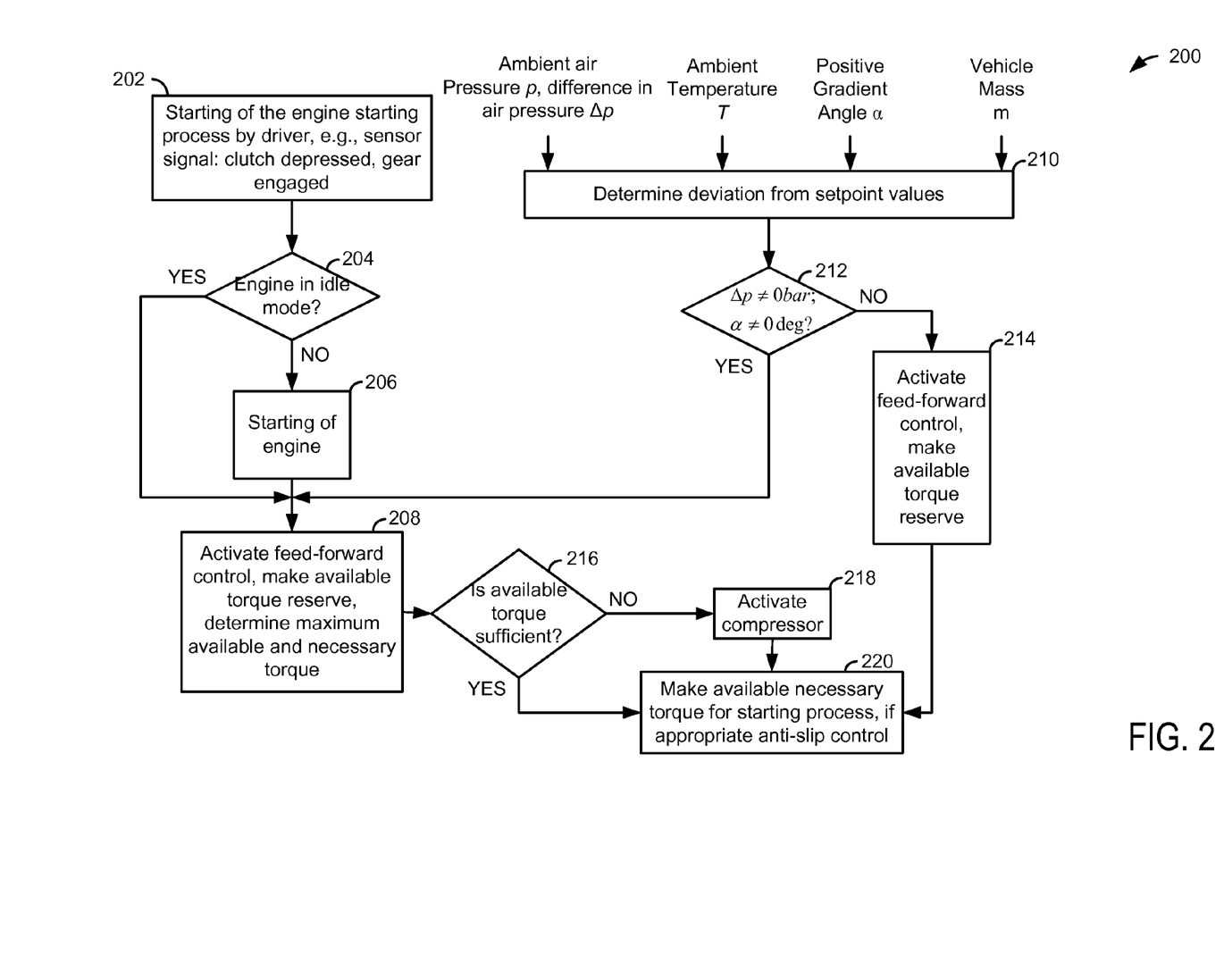
FIG. 2 shows a flowchart of the method according an example of the description in a motor vehicle including a manual gearbox.

As illustrated by way of example in FIG. 2, the starting process of a motor vehicle is initiated with a manual gearbox by the driver by, for example, activating the clutch pedal or by engaging a gear at 202. For this purpose, a sensor by means of whose signal the beginning of the starting process is detected is provided on the clutch pedal or on the gear shift lever. At 204, judged whether the engine of the motor vehicle is already in the idling mode or not. If the engine is not yet running, the answer is no and the engine is automatically started at 206. The engine may be started via engaging a starter and supplying fuel and spark to the engine.

Corresponding sensors determine continuously, for example, every 100 ms, the values of the pressure and of the temperature of the ambient air and the current positive gradient and, if appropriate, the mass and/or the weight of the motor vehicle at 210. These measured values are transmitted to a controller device. The controller device determines whether the respective measured values are within or outside a respective desired range which is stored in the controller device at 212. The desired range is a predetermined range of the respective measurement variable for which it can be assumed, on the basis of preceding measurements or on the basis of a model of the engine of the motor vehicle, that sufficient torque can already be generated for the starting process without switching on the compressor. The desired range may be determined, in particular, by desired values which characterize conditions under which a sufficient torque can be generated even without switching on the compressor, but, if appropriate, with use of a starting controller, for example of a feed-forward controller.

This is the example, in particular, when the measured air pressure p corresponds approximately to the normal air pressure at sea level, the vehicle is on the flat (e.g. $\alpha=0°$), the temperature T does not exceed a predefined temperature, and the mass of the vehicle m does not exceed a predefined mass the answer is no and method 200 proceeds to 214. In this case, it is not desired to activate the compressor for the starting process. All that is then desired is to activate the feed-forward controller which increases the idling speed by opening the throttle valve further or increasing the injected fuel quantity, and as a result makes available a torque reserve. As a result, the torque which is desired for starting can be generated. If appropriate, an anti-slip control is activated in order to improve the starting process further.

However, if at least one of the specified measured values lies outside the respective desired range, that is to say if, for example, the air pressure p is significantly lower than the air pressure at sea level or if the vehicle is located on a perceptible positive gradient ($\alpha>0°$), this is a sign that the torque which can be generated without switching on the compressor might not be sufficient for the starting process, then the answer is yes at 212 and method 200 proceeds to 208. The feed-forward control is then also activated and as a result a torque reserve is made available. Furthermore, the maximum torque which can be generated without activating the compressor while taking into account the current air pressure and the current temperature is determined, as is the torque which is desired to perform starting while taking into account the positive gradient and the mass of the vehicle. If the torque which can be generated in this way is large enough, the compressor does not need to be activated and the answer at 216 is yes so method 200 proceeds to 220. However, if the desired torque cannot be generated without activating the compressor, even with the aid of the feed-forward control, e.g. if an increase in charging pressure is desired, the answer is no at 216 and method 200 proceeds to 218 where the compressor is activated. A clutch, by means of which the compressor is driven by the engine, can, for example, is closed for this purpose. As a result, the torque which is desired for starting can also be generated under unfavorable conditions. In other examples, the compressor may be activated via closing an open turbocharger wastegate or by allowing electrical energy to flow to an electric energy conversion device that rotates the compressor.

The starting is controlled in the further sequence by means of an engine control process corresponding to the position of the accelerator pedal, if appropriate taking into account an anti-slip control process. In this context it is possible, depending on the torque request, to activate the compressor at a later time even in the case in which the compressor was not switched on at the described early time owing to the environmental parameters and/or operating parameters. As a result, sufficient torque is available in all cases.

Figure 3:
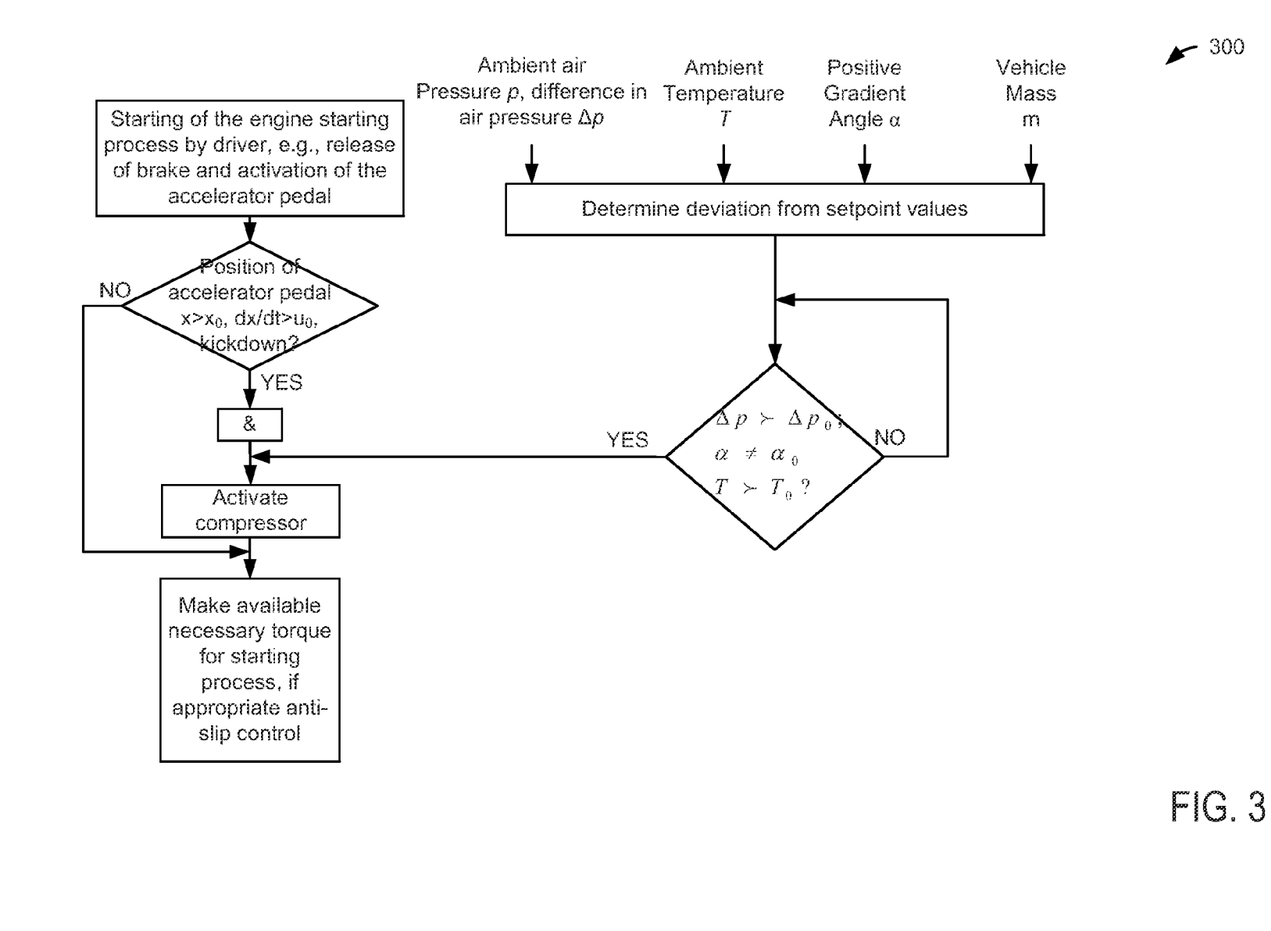
FIG. 3 shows a flowchart of the method according to an example of the description in a motor vehicle including an automatic transmission.

According to method 300 of FIG. 3, the beginning of a starting process is detected in a motor vehicle with an automatic transmission by the activation of the accelerator pedal or release of a brake pedal. If the deflection x of the accelerator pedal or brake pedal does not exceed a predefined limit value $x_0$, the starting is carried out without activating the compressor. Likewise, the starting can take place without activating the compressor if the speed at which the accelerator pedal is depressed is below a threshold value $u_0$ and if no kickdown (e.g., a transmission gear downshift) is activated. If one of the conditions is not met, e.g. if the accelerator pedal is depressed by a long way or quickly or if a kickdown takes place, it is determined whether the vehicle parameters and environmental parameters which are continuously sensed by corresponding sensors lie outside respective desired ranges (see above), that is to say, for example whether the air pressure p is lower than the normal air pressure at sea level by more than a threshold value $\Delta p_0$, whether the positive gradient $\alpha$ is larger than a threshold value $\alpha_0$ and/or whether the temperature T exceeds a predefined maximum temperature $T_0$. If this is the case, e.g. if at least one measurement variable is outside the desired range, the compressor is activated. Otherwise, the compressor is not activated. In addition, a feed-forward control process can be used.

The starting is controlled in accordance with the position of the accelerator pedal, if appropriate using further control processes. In each case, it is possible, depending on the torque request, for the compressor to be switched on at a later time here. In this context, a sufficient torque is always available. Thus, the compressor may be activated from a deactivated state in response to a first increase in engine torque demand from a driver after an engine stop and in response to an environmental parameter being outside of a predetermined range during an engine start from stop.

Figure 4:
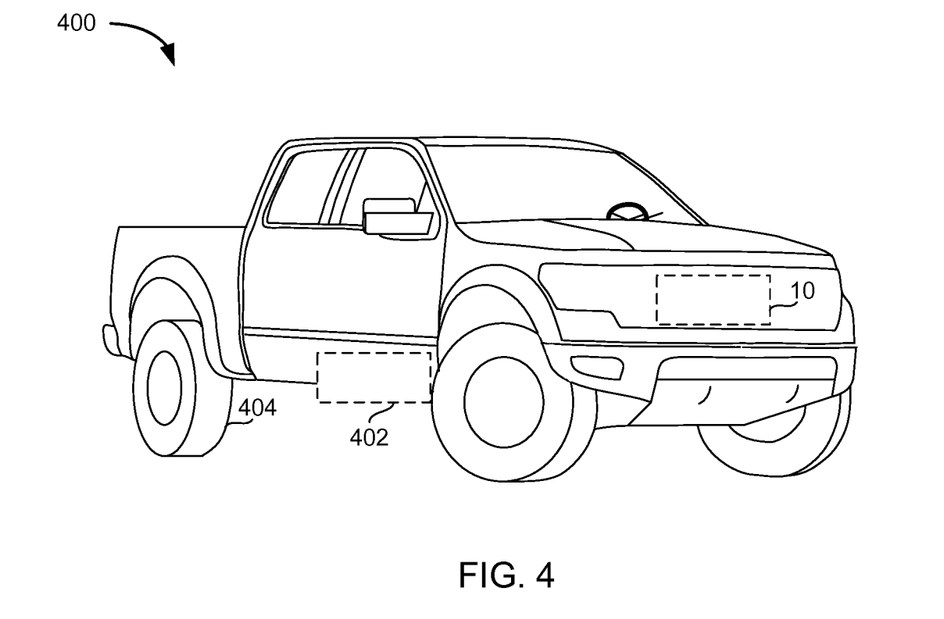
FIG. 4 shows a vehicle in which the methods of FIGS. 2 and 3 may be applied.

Referring now to FIG. 4, a vehicle 400 in which engine 10 supplies torque to vehicle wheels 404 via transmission 402 is shown. Engine 10 receives a torque demand from a driver and transmits torque through transmission 402. Transmission 402 may be an automatic transmission or a manual transmission.

As will be appreciated by one of ordinary skill in the art, routines described in FIGS. 2 and 3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
activating a compressor supplying air to an engine from a deactivated state via a controller before the engine reaches a desired idle speed, the compressor activated in response to an environmental parameter sensed via a sensor coupled to the controller during an engine start from stop, and where the activating the compressor is also in response to a desired engine torque when a driver is not depressing an accelerator pedal.

2. The engine operating method of claim 1, where the environmental parameter is barometric pressure, and where the compressor is activated in response to barometric pressure being less than a threshold value.

3. The engine operating method of claim 1, where the environmental parameter is a gradient of a road, and where the compressor is activated in response to the gradient of the road being a positive value.

4. The engine operating method of claim 1, where the environmental parameter is ambient temperature.

5. An engine operating method, comprising:
activating a compressor supplying air to an engine from a deactivated state via a controller, the compressor activated in response to an increase in engine torque demand from a driver after engine stop and in response to an environmental parameter during an engine start from stop, the increase in engine torque demand and the environmental parameter sensed via sensors coupled to the controller.

6. The engine operating method of claim 5, where said activating the compressor is further in response to a load applied to the engine.

7. The engine operating method of claim 5, further comprising deactivating loads applied to the engine during the engine start from stop.

8. The engine operating method of claim 5, where said activating the compressor is further responsive to a mass of a vehicle being greater than a threshold.

9. The engine operating method of claim 5, where the environmental parameter is humidity.

10. The engine operating method of claim 5, where the environmental parameter is barometric pressure.

11. An engine operating method, comprising:
increasing an engine torque via a controller to supply a torque reserve amount from an engine in response to an environmental parameter sensed via a sensor coupled to the controller during a first engine start from stop; and
activating a compressor supplying air to the engine from a deactivated state via the controller, the compressor activated in response to the environmental parameter during a second engine start from stop.

12. The engine operating method of claim 11, where the engine torque is increased via opening a throttle.

13. The engine operating method of claim 11, further comprising activating the compressor after the first engine start from stop in response to an increasing driver demand torque.

14. The engine operating method of claim 11, further comprising deactivating loads applied to the engine during the second engine start from stop.

15. The engine operating method of claim 11, further comprising activating the compressor during the second engine start from stop in response to ambient temperature.

16. The engine operating method of claim 11, where the second engine start from stop is identified via releasing a clutch pedal.

17. The engine operating method of claim 11, where the second engine start from stop is identified via releasing a brake pedal.

\* \* \* \* \*